Dec. 3, 1963 L. H. BRIXNER 3,113,109
FERROMAGNETIC MATERIAL PRODUCED FROM FERRIC OXIDE
AND BARIUM HALIDE OR STRONTIUM HALIDE, AND
PROCESS FOR MAKING SAME
Filed Oct. 7, 1959
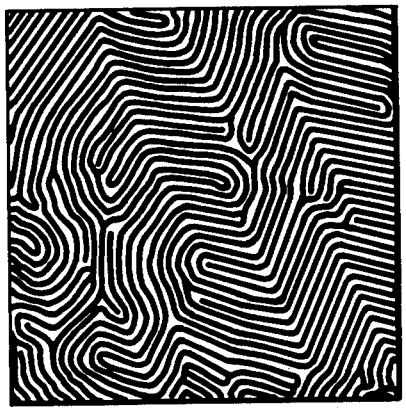
INVENTOR
LOTHAR H. BRIXNER
BY Francis J. Crowley.
ATTORNEY 3,113,109
FERROMAGNETIC MATERIAL PRODUCED FROM FERRIC OXIDE AND BARIUM HALIDE OR STRONTIUM HALIDE, AND PROCESS FOR MAKING SAME
Lothar H. Brixner, West Chester, Pa., assignor to E. I. du Pont de Nemours and Company, Wilmington, Del., a corporation of Delaware
Filed Oct. 7, 1959, Ser. No. 845,591
7 Claims. (Cl. 252—62.5)

This invention relates to the preparation of new and useful ferromagnetic materials and methods for producing the same.

The objects of this invention are accomplished by reacting ferric oxide with a barium halide or a strontium halide at elevated temperatures in an atmosphere of a non-reducing gas such as air, oxygen, nitrogen, carbon dioxide, inert gas, water vapor, and mixtures of such gases.

The reactions of this invention may be carried out by firing a powdered mixture of ferric oxide and metal halide in the presence of the non-reducing atmosphere. In an alternative method, the reaction is carried out by bubbling oxygen, water vapor, or mixtures of these materials with non-reducing gases into a melt made up of barium chloride or strontium chloride, or the corresponding bromides or iodides, and introducing ferric oxide into this melt. This latter procedure is unique in that it will form novel transparent ferromagnetic crystals of $$Ba_{12}Fe_{19} \text{ or } SrFe_{12}O_{19}$$

depending upon whether the metal of the starting halide is barium or strontium. It is also pointed out that the fluorides of barium and strontium may be used in this melt technique to obtain similar results, but in these instances it is essential that water vapor (preferably in admixture with oxygen) be bubbled through the melt. If the barium or strontium halide used in the reaction is water-soluble, the crystals may be recovered by leaching the halide out of the cooled reaction mass. Both of the aforementioned methods are capable of producing ferromagnetic materials of high coercivity and high remanent magnetization.

In the melt technique previously described, proportions are not especially critical so long as there is sufficient halide to act as the reaction medium and to keep the reaction mass fluid. Of course, there should also be sufficient oxygen or water vapor to bubble through the molten halide. Under such conditions, the reaction will proceed according to Equation I when oxygen is bubbled through the melt, and according to Equation II when water vapor is present.

*Equation I*

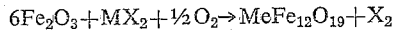
$$6Fe_2O_3 + MX_2 + \tfrac{1}{2}O_2 \rightarrow MeFe_{12}O_{19} + X_2$$

*Equation II*

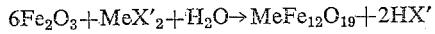
$$6Fe_2O_3 + MeX'_2 + H_2O \rightarrow MeFe_{12}O_{19} + 2HX'$$

wherein Me is Ba or Sr and X is chlorine, bromine, or iodine and X' is fluorine, chlorine, bromine, or iodine.

The excess metal halide necessary to keep the reaction mass in a state of fluidity is between 2 and 3 times the stoichiometric quantity in accordance with the above equations. If the ferromagnetic materials are to be produced by firing a powdered mixture of ferric oxide and metal halide then reacting proportions will vary depending upon the particular halide used. For example, when the fluoride of barium or strontium is the starting material, the reaction will proceed between 1-6 mols of ferric oxide per mol of fluoride. On the other hand, if the barium or strontium halide is a chloride, bromide, or iodide, the reacting proportions are from about 4-6 mols of ferric oxide per mol of metal halide. Reactions using these latter proportions are complex, and it is not possible to assign an empirical formula to the end products since they vary depending upon the reacting proportions and the particular gas which is present during the reaction. It has been found, however, that when the ratio of $Fe_2O_3$ to metal chloride, bromide, or iodide is 6:1 and oxygen or water vapor is present as the non-reducing atmosphere, either $BaFe_{12}O_{19}$ or $SrFe_{12}O_{19}$ is formed. These latter two ferromagnetics are also formed when using the fluoride in the same ratio, provided water vapor is present in the non-reducing atmosphere. It has also been found that when ferric oxide and barium or strontium fluoride are reacted in a mol ratio of 1-4 mols of ferric oxide per mol of fluoride, there is a direct combination of the reactants and the ferromagnetic materials may be represented by the empirical formula $MeF_2 \cdot xFe_2O_3$, wherein Me is the metal of the starting metal halide reactant, and $x$ is from 1-4. Amounts outside the stated ratios can be used, but large excesses of either reactants are preferably avoided, since any unreacted material will contaminate the solid end product. The products of this reaction are ferromagnetic, and they may be magnetized into permanent magnets having high coercivity and high remanent magnetization. The ferromagnetic materials of chemical formula $BaFe_{12}O_{19}$ and $SrFe_{12}O_{19}$ are described in the literature. However, these materials have not previously been produced by the process described herein, and by proceeding according to certain embodiments of this invention (e.g., as illustrated in Examples I, II, XIV and XV) it is possible to prepare these materials in a novel, transparent form. These new forms are especially valuable since they permit the direct study of the internal magnetic structure under the influence of temperature or external magnetic fields. Moreover, it can be seen from the above equations that this invention provides a reaction for producing halogens or hydrogen halides.

Reference is made to the attached drawing which shows the domain structure of a transparent single crystal of ferromagnetic $BaFe_{12}O_{19}$ at a magnification of 680×. A further discussion of this crystal will be presented in connection with Example I.

A relatively wide range of reaction temperatures may be used in attaining the objects of this invention. The temperature, of course, must be sufficiently high for the reaction to be effected, but the upper limit is dependent chiefly upon considerations of cost and the problem of handling the end products at unnecessarily high temperatures. A suggested reaction temperature for the production of ferromagnetic materials is about 950° C.–1350° C. Temperatures in the range of 1100° C.–1300° C. are preferred. When the reaction is carried out with the metal halide in the molten state, a reaction time of about 3 hours is usually sufficient to insure reaction. However, longer reaction times can be used, if desired. If the metal halide is in the solid state, the reaction times are longer, and of course, they will vary with the size of the batch being fired. If the firing is carried out in a single step, the heating period is usually at least 4 hours, and considerably longer periods will be used if the amount of material being fired is large. Optimum firing time for a given set of conditions can be determined by checking the ferromagnetic properties of the solid product, or in cases where by-product gases are liberated, completion of the reaction can be determined by the absence of these by-products in the off-gas stream. If the heating should be stopped too soon, the material can be refired without harmful effect. On the other hand, if the material is fired slightly longer than needed, it will not seriously affect the end product. In instances where a ferromagnetic material is being produced by firing, it may be preferable to presinter the reactants. Presintering procedures are well known. For example, the reactants in proper proportion may be heated at temperatures of about 700° C.–1100° C., and the heating time, which is not especially critical, may range from 2–24 hours or more, depending upon the temperature used. The product of the presintering is usually cooled, pulverized and compacted under pressure into a unitary mass of the desired shape by pressing or extruding. This mass is then subjected to final firing to produce the desired ferromagnetic end product. Presintering will reduce the final firing time; e.g., in some of the specific examples which follow, it was reduced to 1 hour.

For a clearer understanding of my invention, the following specific examples are given. These examples are intended to be merely illustrative of the invention and not in limitation thereof. The reactants used in these examples were high-purity, commercially available materials, and unless otherwise specified all parts are by weight.

EXAMPLE I $BaF_2$ and $Fe_2O_3$ in a mol ratio of 1:6 were mixed and placed in a platinum crucible and heated in the presence of oxygen containing a small amount of water vapor to 1200° C. for a period of about 8 hours. During this heating, considerable weight loss was observed, and the X-ray powder pattern of the reaction product indicated $BaFe_{12}O_{19}$ or an isomorphous compound as the only phase. Analysis of the product, and the weight loss indicated that the following reaction occurred:

*Equation III*

$$6Fe_2O_3 + BaF_2 + H_2O \rightarrow BaFe_{12}O_{19} + 2HF$$

Part of the reaction product was obtained in the form of transparent, red single crystalline platelets 10–100 microns thick and up to 2 mm. in diameter. The mass of the product was polycrystalline.

The experiment was repeated 5 additional times, and the same kind of product was obtained in each case. Analyses of the products gave the following results:

*Table I.—Weight Loss Data*

| Total Amount of $BaF_2 + Fe_2O_3$ reacted in grams | Weight Loss Found in grams | Weight Loss calculated according to Equation III |
|---|---|---|
| 19.392 | 0.375 | 0.3763 |
| 19.392 | 0.374 | |
| 59.145 | 1.135 | 1.1476 |
| 59.145 | 1.140 | |
| 118.290 | 2.301 | 2.295 |
| 129.280 | 2.500 | 2.508 |

By determining the oxidation state of the iron in the final reaction product, one can further establish that the indicated reaction took place. According to the reaction, the compound resulting would have all iron in the trivalent state. To check this, the active oxygen was determined by a Bunsen distillation. Results were as follows:

*Table II.—Analysis and Oxidation State of the Reaction Product*

| Found | Calc. for the Reaction of Equation III ($BaFe_{12}O_{19}$) |
|---|---|
| Ba, 12.35 | 12.36 |
| Fe, 60.23 | 60.29 |
| F, 0.02 | 0.00 |
| "O," [1] 8.62 | 8.63 |

[1] Active oxygen.

Further evidence for this reaction having taken place was the direct detection of fluorine in the product evolved.

The reaction mixture of 3.00 grams $BaF_2$ and 16.392 grams $Fe_2O_3$ contained in a Pt boat was heated at 1300° C. in flowing air containing water vapor. A loose plug of silica wool was placed in the mullite reaction tube downstream from the boat, and exit gases passed through a water trap. During the reaction, a white precipitate formed in the trap. This precipitate was identified as $SiO_2$, both by chemical analysis and X-ray diffraction. In the acidic filtrate of the $SiO_2$, $CaSl_2$ precipitated a white compound which was identified by X-ray diffraction as $CaF_2$. These facts can be explained by the above reactions in which HF is the product gas.

Powder samples of the $BaFe_{12}O_{19}$ were sealed in .3 mm. Lindemann glass capillaries and were mounted in a 114.6 mm. camera. Exposure times to copper K-alpha ($\lambda = 1.5418$ A.) radiation varied between 8 and 10 hrs. Aluminum foil was placed over the film to minimize fluorescence effects. The observed $d$-spacings and visually observed intensities together with the data given on ASTM file card 7–276 are summarized in Table III.

*Table III.—X-Ray Powder Diffraction Data*

| $BaFe_{12}O_{19}$ Prepared by this Invention | | ASTM-7-276 for $BaFe_{12}O_{19}$ | |
|---|---|---|---|
| d | Intensity | d | Intensity |
| 3.84 | 2 | 3.86 | 2 |
| 2.95 | 3 | 2.94 | 4 |
| 2.89 | 2 | 2.89 | 2 |
| | | 2.85 | 1 |
| 2.76 | 9 | 2.77 | 10 |
| 2.62 | 7 | 2.62 | 10 |
| 2.54 | 1− | 2.55 | 1− |
| 2.52 | 1− | 2.52 | 1− |
| 2.42 | 4 | 2.42 | 4 |
| 2.24 | 4 | 2.23 | 4 |
| 2.13 | 3 | 2.13 | 3 |
| 1.95 | 1 | 1.945 | 1 |
| 1.81 | 2 | 1.814 | 2 |
| | | 1.715 | 1− |
| | | 1.699 | 1 |
| 1.665 | 6 | 1.66 | 4 |
| 1.625 | 7 | 1.625 | 5 |
| | | 1.530 | 1 |
| 1.475 | 6 | 1.473 | 4 |
| 1.390 | 3 | 1.389 | 2 |
| | | 1.313 | 1− |
| 1.303 | 3 | 1.302 | 2 |

Single crystal data were obtained by precession about the $c$-axis in a precession camera. 0 and 1 level photographs were taken and the elementary hexagonal cell dimensions were found to be $a_0 = 5.88$ A., $c_0 = 23.20$ A. These measurements are in substantial agreement with the reported data given for the compound $BaFe_{12}O_{19}$, in Philips Tech. Rev., vol. 18, No. 6, 1956, p. 153. The measurements given are: $a_0 = 5.9$ A. and $c_0 = 23.3$ A. The space group is $D_{6h}^4 - P\ 63/mmc$. With two formula weights per unit cell, the X-ray density is 5.31 grams cc.$^{-1}$.

The attached drawing is a pattern of the magnetic domains of the transparent $BaFe_{12}O_{19}$ at a magnification of 680×. The pattern was obtained with polarized light; the analyzer was slightly off (by about 5°) the "crossed position." Since the single easy direction of magnetization (along the $c$-axis) of the hexagonal platelets coincides with the optical path, domains magnetized in one direction rotate the plane of polarization (by the Faraday effect) toward complete extinction, whereas domains magnetized in the opposite direction rotate it in the sense to allow more light to pass through the analyzer.

EXAMPLE II

This example is similar to Example I except that $BaCl_2$ was used in place of $BaF_2$. There was also a quantitative determination of the chlorine released, and the yield was compared (see Table IV) with the theoretical yield according to the following equation:

$$BaCl_2 + 6Fe_2O_3 + \tfrac{1}{2}O_2 \rightarrow BaFe_{12}O_{19} + Cl_2$$

The procedure was as follows: 2.000 grams of $BaCl_2$ and 9.202 grams of $Fe_2O_3$ (mol ratio 1:6) were reacted under flowing air for 6 hours at 1200° C. The reaction was carried out in a platinum dish within a tube furnace. The gas stream leaving the tube was passed through a KI solution, and the iodine released was titrated with sodium thiosulfate. A correction was made for the oxidation of KI by oxygen as determined in a blank run.

*Table IV.—Analysis of Reaction Product of Example II*

|  | Found | Calc. |
|---|---|---|
| Ba | 12.32 | 12.36 |
| Fe | 60.21 | 60.29 |
| Cl (released as end product) | 0.6800 | 0.6810 |
| Cl (retained in solid reaction product) | 0.01 | 0.00 |

The X-ray diffraction pattern again indicated $BaFe_{12}O_{19}$ as the only phase.

The following examples illustrate the use of various mol ratios of ferric oxide to metal halide and the carrying out of the reaction in the presence of various gases.

EXAMPLE III

Twenty-five grams of barium fluoride, $BaF_2$ and 22.77 grams of iron oxide, $Fe_2O_3$ (mol ratio of 1:1) were intimately mixed and fired in air in a platinum dish for 14 hours at a temperature of 950° C. A dark-brown powder resulted. This powder was ball-milled in ethyl alcohol for 24 hours, filtered onto a fritted disc, dried at 140° C. in a drying oven, and passed through a 200-mesh sieve. The material was then hydrostatically compacted at 200,000 p.s.i. without binder into a cylindrical rod ½" in diameter and 1½" long. The rod was subjected to a final firing in a platinum container at 1200° C. for one hour in an atmosphere of oxygen.

The ferromagnetic properties of the resulting rod were obtained by making the rod into a magnet and testing the latter at room temperature. The values obtained are presented below. Any values given in this specification in regard to magnetic properties were obtained with a Sanford-Bennett high-field permeameter from the Rubicon Company. The cylindrical rod sample was in each case butted between the pole pieces of the permeameter and subjected to the standard operating procedure for obtaining the demagnetizing curve.

$B_s$, Saturation magnetization ($4\pi i_s$)_____gauss__ 1850
$B_r$, Remanent magnetization_____do____ 1045
$iH_c$, Intrinsic coercivity_____oersteds__ 3200
$B_r/B_s$ _____ 0.56

The advantage obtained by use of an oxygen atmosphere in the final firing is shown by the following results. These were obtained on a sample prepared as given above except that the final firing was carried out in an atmosphere of argon at 1000° C. for 1 hour. In this example and in the other examples where the final firing was done in an atmosphere other than oxygen, the temperatures used were kept sufficiently low to insure against loss of oxygen from the compound which has been formed. Moreover, in all of the examples in this specification, the heatings were carried out in a platinum container to minimize contamination.

$B_s$, Saturation magnetization _____gauss__ 981
$B_r$, Remanent magnetization_____do____ 900
$iH_c$, Intrinsic coercivity_____oersteds__ 2000
$B_r/B_s$ _____ 0.92

EXAMPLE IV

Twenty grams of $BaF_2$ and 36.44 grams of $Fe_2O_3$, (mol ratio 1:2) were mixed together, prefired for 12 hrs. in air at 1000° C., ground, dried, sieved, and compacted in the same manner as described in Example III. The cylindrical rod which resulted was finally fired in a platinum container at 1200° C. in oxygen for 1 hour. The magnetic properties of the resulting product were as follows:

$B_s$, Saturation magnetization_____gauss__ 2032
$B_r$, Remanent magnetization_____do____ 1600
$iH_c$, Intrinsic coercivity_____oersteds__ 2550
$B_r/B_s$ _____ 0.79

Another sample was prepared in the same manner as above, except that the final firing was carried out under an atmosphere of nitrogen at 1100° C. for 1 hour. The magnetic properties were as follows:

$B_s$, Saturation magnetization_____gauss__ 1800
$B_r$, Remanent magnetization_____do____ 1300
$iH_c$, Intrinsic coercivity_____oersteds__ 1200
$B_r/B_s$ _____ 0.72

EXAMPLE V

In another experiment, 15.00 grams of $BaF_2$ and 40.98 grams of $Fe_2O_3$ (mol ratio 1:3), were mixed and treated as in Example III. The rod obtained had the following magnetic properties.

$B_s$, Saturation magnetization_____gauss__ 1980
$B_r$, Remanent magnetization_____do____ 1580
$iH_c$, Intrinsic coercivity_____oersteds__ 2200
$B_r/B_s$ _____ 0.80

When the final firing was carried out under an atmosphere of argon for 1 hour at 1000° C., the magnetic properties were found to be as follows:

$B_s$, Saturation magnetization_____gauss__ 2033
$B_r$, Remanent magnetization_____do____ 1565
$iH_c$, Intrinsic coercivity _____oersteds__ 1170
$B_r/B_s$ _____ 0.77

EXAMPLE VI

Twelve grams of $BaF_2$ and 43.72 grams of $Fe_2O_3$, (mol ratio 1:4), were mixed, presintered in air in a platinum crucible at 950° C. for 12 hours and ball-milled under alcohol for 24 hours. The dried and sieved powder was compacted at 200,000 p.s.i. into a cylindrical rod and fired at 1200° C. in oxygen for one hour. The magnetic properties were found to be as follows:

$B_s$, Saturation magnetization_____gauss__ 1529
$B_r$, Remanent magnetization_____do____ 1400
$iH_c$, Intrinsic coercivity_____oersteds__ 2000
$B_r/B_s$ _____ 0.91

EXAMPLE VII

Ten grams of $BaF_2$ and 45.54 grams $Fe_2O_3$ (mol ratio 1:5) were mixed, presintered in air for 12 hours at 1000° C., and then ball-milled under alcohol for 24 hours. The material was filtered off, dried at 140° C. in air and passed through a 200-mesh screen. This powder was compacted at 195,000 p.s.i. and the rod finally fired at 1200° C. in oxygen for 1 hour. The magnetic properties of the rod were as follows:

$B_s$, Saturation magnetization_____gauss__ 1976
$B_r$, Remanent magnetization_____do____ 1550
$iH_c$, Intrinsic coercivity_____oersteds__ 2000
$B_r/B_s$ _____ 0.78

A sample prepared in exactly the same way up to the final firing step was fired in an atmosphere of nitrogen at 1100° C. for one hour. The magnetic properties of this rod were as follows:

$B_s$, Saturation magnetization_____gauss__ 1372
$B_r$, Remanent magnetization_____do____ 1230
$iH_c$, Intrinsic coercivity_____oersteds__ 1100
$B_r/B_s$ _____ 0.81

EXAMPLE VIII

A mixture of 10.00 grams of $BaF_2$ and 54.64 grams of $Fe_2O_3$ (mol ratio 1:6) was presintered for 14 hours at 1000° C. in air and ball-milled, dried, sieved, and compacted in the previously described manner. The final firing of the rod was done at 1250° C. for 2 hours in oxygen. The magnetic properties of the resulting rod were as follows:

$B_s$, Saturation magnetization _____ gauss__ 1470
$B_r$, Remanent magnetization _____ do____ 1425
$iH_c$, Intrinsic coercivity _____ oersteds__ 1250
$B_r/B_s$ _____ 0.97

To show the results obtained by conducting the final firing in oxygen at a lower temperature and for a shorter period of time, another sample was prepared and treated in the same manner up to the final firing. Then the sample was heated in oxygen at 1100° C. for one hour. The magnetic properties of the rod obtained under these conditions were as follows:

$B_s$, Saturation magnetization _____ gauss__ 1418
$B_r$, Remanent magnetization _____ do____ 1370
$iH_c$, Intrinsic coercivity _____ oersteds__ 1490
$B_r/B_s$ _____ 0.96

EXAMPLE IX 20 grams of $BaCl_2$ and 92 grams $Fe_2O_3$ (mol ratio 1:6) were thoroughly mixed and heated in a platinum crucible under a flow of air to 1100° C. for a period of 7 hours. After cooling the material in the furnace, an almost black, chlorine-free product was obtained. This product was ball-milled until all would pass through a 100 mesh screen. This powder was pressed at 190,000 p.s.i. into a rod ½" x 1½" and was refired at 1300° C. in air for ½ hour. The rod was cooled in air and tested for magnetic properties. These were found to be as follows:

$B_s$, Saturation magnetization _____ gauss__ 1852
$B_r$, Remanent magnetization _____ do____ 950
$iH_c$, Intrinsic coercivity _____ oersteds__ 500
$B_r/B_s$ _____ .051

EXAMPLE X

This example illustrates using a stoichiometric excess of $Fe_2O_3$.

8.0 grams of $BaF_2$ and 51.00 grams $Fe_2O_3$ (mol ratio 1:7) were mixed, presintered at 1000° C. in air for 10 hours, and ball-milled under alcohol for 22 hours. The mixture was then filtered off, dried and sieved through a 200-mesh screen. After compacting the compound into a cylindrical rod at 195,000 p.s.i. without binder, the rod was fired at 1200° C. in oxygen for one hour.

Magnetic properties of the product were as follows:

$B_s$, Saturation magnetization _____ gauss__ 1950
$B_r$, Remanent magnetization _____ do____ 1290
$iH_c$ Intrinsic coercivity _____ oersteds__ 1950
$B_r/B_s$ _____ 0.66

A second sample having a mole ratio 1:7 of $BaF_2$ to $Fe_2O_3$ was prepared in the same manner except that the final firing took place at 1100° C. in an atmosphere of $CO_2$. The magnetic properties of the product were:

$B_s$, Saturation magnetization _____ gauss__ 1380
$B_r$, Remanent magnetization _____ do____ 1200
$iH_c$, Intrinsic coercivity _____ oersteds__ 1650
$B_r/B_s$ _____ 0.87

EXAMPLE XI 6 grams of $SrF_2$ and 45.762 grams $Fe_2O_3$ (mol ratio 1:6) were thoroughly mixed and heated in a platinum dish in air for 6 hours to 1100° C. The black, ferromagnetic product was ball-milled to pass a 200 mesh screen and subsequently pressed into a cylindrical rod at 200,000 p.s.i. This rod was again fired in air at 1200° C. for 2 hours and the magnetic properties were as follows:

$B_s$, Saturation magnetization _____ gauss__ 2552
$B_r$, Remanent magnetization _____ do____ 1690
$iH_c$, Intrinsic coercivity _____ oersteds__ 1820
$B_r/B_s$ _____ 0.73

EXAMPLE XII

In this example, 7 grams of $SrF_2$ and 44.442 grams $Fe_2O_3$ (mol ratio 1:5) were treated in the same manner as in Example XI, and the magnetic properties were found to be as follows:

$B_s$, Saturation magnetization _____ gauss__ 1500
$B_r$, Remanent magnetization _____ do____ 1090
$iH_c$, Intrinsic coercivity _____ oersteds 2700
$B_r/B_s$ _____ 0.73

EXAMPLE XIII 1.00 gram of $SrF_2$ and 7.627 grams of $Fe_2O_3$ (mol ratio 1:6) were intimately mixed and put in a platinum boat within a tube furnace. Moist oxygen was passed over the mixture at 1300° C. for 4 hours to produce $SrFe_{12}O_{19}$. The procedure of this example has a distinct advantage over the use of dry oxygen, since the presence of water in the oxygen makes possible the following reaction:

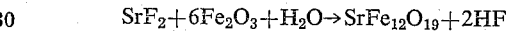

$$SrF_2 + 6Fe_2O_3 + H_2O \rightarrow SrFe_{12}O_{19} + 2HF$$

The reaction shown above is faster than one using dry oxygen due to the energy of formation of HF. The magnetic properties of the reaction product were as follows:

$B_s$, Saturation magnetization _____ gauss__ 2100
$B_r$, Remanent magnetization _____ do____ 1260
$iH_c$, Intrinsic coercivity _____ oersteds__ 1500
$B_r/B_s$ _____ 0.60

It will be noted that in this example the water vapor was introduced into the reaction zone in admixture with oxygen. This is a preferred procedure. However, the water vapor may be introduced alone or in admixture with air, an inert gas such as argon or helium, or any other gas which is unreactive under the conditions used.

Examples XIV and XV are presented below to illustrate the production of $BaFe_{12}O_{19}$ and $SrFe_{12}O_{19}$, respectively, by contacting ferric oxide with a melt of the corresponding halide while bubbling oxygen through the latter.

EXAMPLE XIV

Three hundred grams of anhydrous $BaCl_2$ were melted in a platinum dish and oxygen was bubbled through a perforated platinum tube into the melt. At 1250° C., 10.00 grams $Fe_2O_3$ were introduced into the melt and reacted for 3 hours. The furnace was then cooled at a rate of 50° per hour. The cold reaction mixture was leached with water and 0.1 N HCl. The product consisted of 11.5 grams (98% yield) of lustrous platelets, most of which were transparent. It was found by means of an X-ray diffraction powder pattern that $BaFe_{12}O_{19}$ was the only phase obtained.

The $BaFe_{12}O_{19}$ thus obtained was ground to a powder and hydrostatically compacted at 200,000 p.s.i. without binder into a cylindrical rod. The rod was again fired in a platinum container at 1250° C. for one hour. The magnetic properties of the final rod were as follows:

$B_s$, Saturation magnetization _____ gauss__ 2050
$B_r$, Remanent magnetization _____ do____ 1000
$iH_c$, Intrinsic coercivity _____ oersteds__ 2500

EXAMPLE XV

Ten (10.00) grams of $Fe_2O_3$ were reacted in 300.00 grams of molten $SrCl_2$ under conditions identical to those described in Example XIV. The product consisted of platelets of $SrFe_{12}O_{19}$, most of which were transparent. Analysis for Sr and Fe was as follows:

|    | Found | Calc. |
|----|-------|-------|
| Sr | 8.17  | 8.25  |
| Fe | 62.89 | 63.12 |

X-ray diffraction patterns were obtained in the manner described in Example I. The observed $d$-spacings and visually observed intensities are given below:

*X-Ray Powder Diffraction Data for $SrFe_{12}O_{19}$*

| $d$    | Intensity |
|--------|-----------|
| 2.925  | 4         |
| 2.864  | 2         |
| 2.756  | 10        |
| 2.607  | 9         |
| 2.529  | 1         |
| 2.495  | 1         |
| 2.411  | 4         |
| 2.22   | 4         |
| 2.117  | 3         |
| 1.928  | 1         |
| 1.794  | 1         |
| 1.641  | 4         |
| 1.614  | 5         |
| 1.528  | 1         |
| 1.467  | 4         |
| 1.379  | 5         |
| 1.310  | 1−        |

Single crystal data were obtained by precession about the $c$-axis in a precession camera. 0 and 1 level photographs were taken and the elementary hexagonal cell dimensions for the $SrFe_{12}O_{19}$ were found to be $a_0 = 5.86$ A. and $c_0 = 23.00$ A.

The product was ground to a powder and compacted into a cylindrical rod and tested for magnetic properties in the same manner as in Example XIV. The results are given below:

$B_s$, Saturation magnetization_____gauss__ 1975
$B_r$, Remanent magnetization_____do____ 550
$iH_c$, Intrinsic coercivity_____oersteds__ 300

In Examples XIV and XV just above, the ferromagnetic crystals produced in the molten metal halide were compacted and sintered before determining their ferromagnetic properties. This procedure was for the purpose of forming the crystal into a strong compacted mass. However, in instances where the strength of the compacted material is not important, it may be used as a ferromagnetic material without firing. Furthermore, in powder applications, the crystalline product from the reaction may be used without further processing.

As indicated by the above examples in which two firings are used, a better ferromagnetic material is produced when the second (final) firing is carried out in an atmosphere of oxygen rather than in an atmosphere of carbon dioxide, nitrogen, or inert gas. However, these other atmospheres will produce a suitable ferromagnetic material.

Although the foregoing examples employ the chlorides and fluorides of the metals barium and strontium, the bromides and the iodides of these metals may be used. However, these are much more expensive and less readily available than the fluorides and chlorides. Therefore, when the reaction is accomplished by firing a powdered mixture of ferric oxide and metal halide, it is preferable to use a fluoride or chloride of barium or strontium.

The high coercive force and high remanence of the ferromagnetic products of this invention make them very valuable in numerous applications where permanent magnets are required. Among these are mechanical-holding applications, such as door latches, mechanical couplings, etc. Such permanent magnetic materials are also useful in relays, direct-current motors, rotors, circuit breakers, high-frequency alternators, and television focusing yokes. In addition to these conventional uses for ferromagnetic materials, the transparent ferromagnetic crystals of $BaFe_{12}O_{19}$ and $SrFe_{12}O_{19}$ have additional utility in magneto-optical applications where magnetically hard, transparent materials are necessary.

Since the preparation of $BaFe_{12}O_{19}$ and analogous compounds according to this invention can result in the evolution of elemental halogens, it is evident that these compounds will be non-reactive with the particular halogen liberated, at least up to the maximum temperature employed in its synthesis. Therefore, the present invention contemplates the use of such compounds for containing elemental halogens at elevated temperatures. Among the types of equipment where compounds such as $BaFe_{12}O_{19}$ would find use in containing halogens are storage containers, conduits, reactors, etc. The fabrication of such equipment can be readily accomplished by conventional ceramic techniques involving pressing and sintering, such as are now employed in the production of shaped magnets of $BaFe_{12}O_{19}$. For example, $BaFe_{12}O_{19}$, produced by the process of this invention or by other routes, may be compacted into a tube and sintered at 1200° C. to produce a structural component useful as a conduit for carrying halogens or as a tube furnace wherein $BaF_2$ and $Fe_2O_3$ are reacted in the presence of oxygen.

Since it is obvious that many changes and modifications can be made in the above-described details without departing from the spirit and scope of the invention, it is to be understood that the invention is not to be limited to said details except as set forth in the appended claims.

This case is a continuation-in-part of my copending application Serial No. 744,818, filed June 26, 1958, and now abandoned, which in turn is a continuation-in-part of my application Serial No. 699,482, filed November 29, 1957, now abandoned.

I claim:

1. A process for the production of a ferromagnetic material of chemical composition $MeFe_{12}O_{19}$ where Me is a metal selected from the group consisting of barium and strontium, consisting of reacting, at temperatures of from about 700° C. to 1350° C., ferric oxide and a halide of a group II–A metal having an atomic number of 38 to 56, inclusive, in the presence of a non-reducing atmosphere selected from the group consisting of water vapor, oxygen, and mixtures of these gases with other non-reducing gases, the mol ratio of metal halide to ferric oxide being about from 1:1 to 1:6, and recovering a ferromagnetic crystalline product.

2. A process for producing a ferromagnetic material of chemical composition $MeFe_{12}O_{19}$ where Me is a metal selected from the group consisting of barium and strontium, comprising reacting ferric oxide and a metal halide selected from the group consisting of barium chloride, barium bromide, barium iodide, strontium chloride, strontium bromide, and strontium iodide, the mol ratio of metal halide to ferric oxide being from 1:4 to 1:6, said reaction being conducted in the presence of a non-reducing atmosphere selected from the group consisting of water vapor, oxygen, and mixtures of these gases with other non-reducing gases and at temperatures of from about 700° C.–1350° C., and recovering a ferro-magnetic crystalline product.

3. The process of claim 2 in which the metal halide is barium chloride.

4. A process for producing a ferromagnetic material of chemical composition $BaFe_{12}O_{19}$, consisting of reacting ferric oxide with barium fluoride in a barium fluoride: ferric oxide mol ratio of 1:1 to 1:6, said reaction being conducted in the presence of a non-reducing atmosphere selected from the group consisting of water vapor, oxygen, and mixtures of these gases with other non-reducing gases and at temperatures of from about 700° C. to 1350° C., and recovering a ferromagnetic crystalline product.

5. A process for producing a ferromagnetic material of chemical composition $SrFe_{12}O_{19}$ consisting of reacting ferric oxide with strontium fluoride in a strontium fluoride:ferric oxide mol ratio of 1:1 to 1:6, said reaction being conducted in the presence of a non-reducing atmosphere selected from the group consisting of water vapor, oxygen, and mixtures of these gases with other non-reducing gases, and at temperatures of from about 700° C. to 1350° C., and recovering a ferromagnetic crystalline product.

6. A process for producing a ferromagnetic material of chemical composition $MeFe_{12}O_{19}$ where Me is a metal selected from the group consisting of barium and strontium, comprising introducing ferric oxide into a molten halide of a group II–A metal having an atomic number of 38 to 56, inclusive, while bubbling through said melt a gas selected from the group consisting of oxygen, water vapor, and mixtures of these materials with non-reducing gases the mol ratio of metal halide to ferric oxide being about from 1:1 to 1:6, and recovering a ferromagnetic crystalline product.

7. The process of claim 6 in which the metal halide is barium chloride and the metal halide:ferric oxide mol ratio is from 1:4 to 1:6.

References Cited in the file of this patent

UNITED STATES PATENTS

| | | |
|---|---|---|
| 390,895 | Pechiney | Oct. 9, 1888 |
| 1,236,570 | Jones et al. | Aug. 14, 1917 |
| 1,728,230 | DeBoer | Sept. 17, 1927 |
| 2,191,981 | DeJohn | Feb. 27, 1940 |
| 2,531,046 | Hollingsworth | Nov. 21, 1950 |
| 2,579,978 | Snoek et al. | Dec. 25, 1951 |
| 2,736,708 | Crowley et al. | Feb. 28, 1956 |
| 2,762,777 | Went et al. | Sept. 11, 1956 |
| 2,762,778 | Gorter et al. | Sept. 11, 1956 |
| 2,827,437 | Rathenau | Mar. 18, 1958 |
| 2,893,830 | Brixner | July 7, 1959 |

FOREIGN PATENTS

| | | |
|---|---|---|
| 697,219 | Great Britain | Sept. 16, 1953 |
| 514,251 | Canada | June 28, 1955 |

OTHER REFERENCES

Jonker et al.: Philips Technical Review, November 1956, pages 149–154.

Helpert et al.: Z. fur Phys. Chemie, vol. 22, pp. 395–404 (1933) (publications in Scientific Library).

Harvey et al.: RCA Review, September 1950, pp. 344–349 (publications in Sci. Lib.).

Erchak et al.: J. Amer. Chem. Soc., October 1946, p. 2090.

Jonker et al.: Philips Tech. Rev., November 1956, p. 146.